United States Patent [19]
Yanagisawa

[11] Patent Number: 5,856,959
[45] Date of Patent: Jan. 5, 1999

[54] METHOD FOR GENERATING A FOCUS ERROR SIGNAL DUE TO ASTIGMATISM AND OPTICAL PICKUP DEVICE USING THE SAME

[75] Inventor: Takuma Yanagisawa, Tsurugashima, Japan

[73] Assignee: Pioneer Electronic Corporation, Tokyo, Japan

[21] Appl. No.: 904,491

[22] Filed: Aug. 1, 1997

[30] Foreign Application Priority Data

Aug. 21, 1996 [JP] Japan .................................. 8-219526

[51] Int. Cl.⁶ ........................................................ G11B 7/00
[52] U.S. Cl. .................................. 369/44.23; 369/44.41; 369/44.37
[58] Field of Search ........................ 359/823; 369/44.32, 369/44.37, 44.41, 44.42, 54, 112

[56] References Cited

U.S. PATENT DOCUMENTS

| | | | |
|---|---|---|---|
| 4,829,506 | 5/1989 | Bressers et al. | 369/112 |
| 4,888,752 | 12/1989 | Arai | 369/44 |
| 5,113,386 | 5/1992 | Whitehead et al. | 369/44.41 |
| 5,173,890 | 12/1992 | Miyake et al. | 369/44.23 |
| 5,241,523 | 8/1993 | Kessler | 369/44.14 |
| 5,282,192 | 1/1994 | Yamada et al. | 369/275.4 |
| 5,391,865 | 2/1995 | Kurata et al. | 250/201.5 |
| 5,412,631 | 5/1995 | Komma et al. | 369/44.37 |
| 5,491,675 | 2/1996 | Kay | 369/44.23 |
| 5,493,425 | 2/1996 | Yang | 359/15 |
| 5,557,601 | 9/1996 | Nishikawa | 369/121 |
| 5,629,916 | 5/1997 | Komiya | 369/110 |
| 5,696,749 | 12/1997 | Brazas, Jr. et al. | 369/109 |
| 5,761,162 | 6/1998 | Gerber et al. | 369/44.23 |

*Primary Examiner*—Georgia Epps
*Assistant Examiner*—Ricky Mack
*Attorney, Agent, or Firm*—Perman & Green, LLP

[57] ABSTRACT

A method and an optical pickup device for generating a focus error signal are disclosed. The device includes an irradiation optics for irradiating laser beams onto an information recording surface of an optical disc, a first and a second photodetector for receiving reflected light, and photodetection optics having an astigmatism generating element for applying astigmatism to light reflected from the information recording surface and for introducing the reflected light to the first and the second photodetectors. The device also includes first and second photodetecting circuits which generate a first and a second preliminary focus error signal. The photodetecting circuits include a first and a second diagonal adder connected to the first and the second photodetector, and a diagonal differential device connected to the first and the second diagonal adders for generating an output difference between outputs of the first and the second diagonal adders as the first and the second preliminary focus error signals. The device further includes a device for generating a focus error signal calculated from the first and the second preliminary focus error signals.

7 Claims, 13 Drawing Sheets

FIG. 1
PRIOR ART
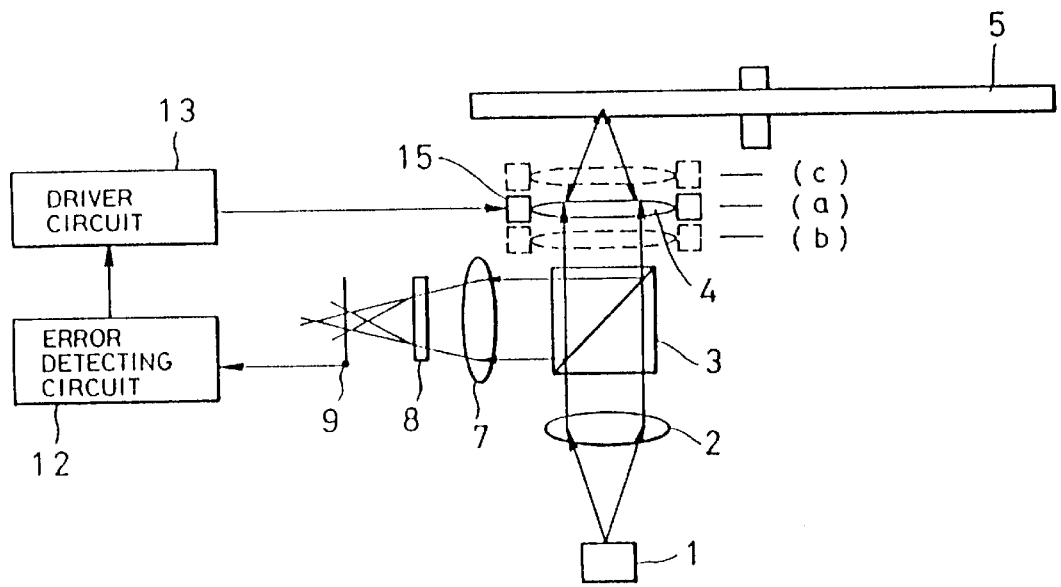
FIG. 2A
PRIOR ART
FIG. 2B
PRIOR ART
FIG. 2C
PRIOR ART
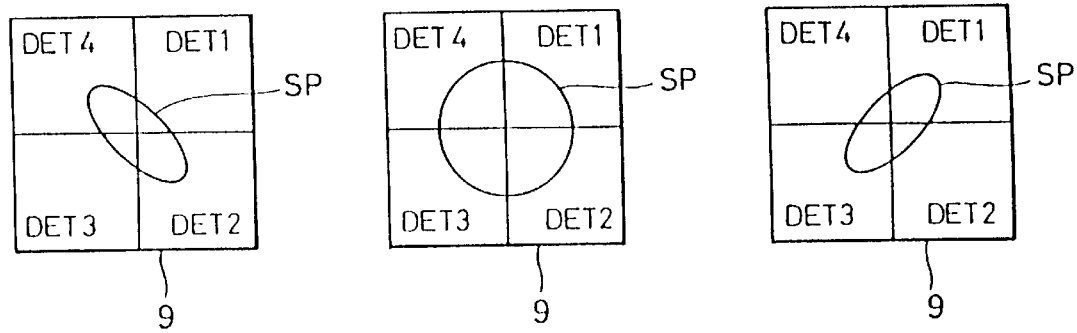

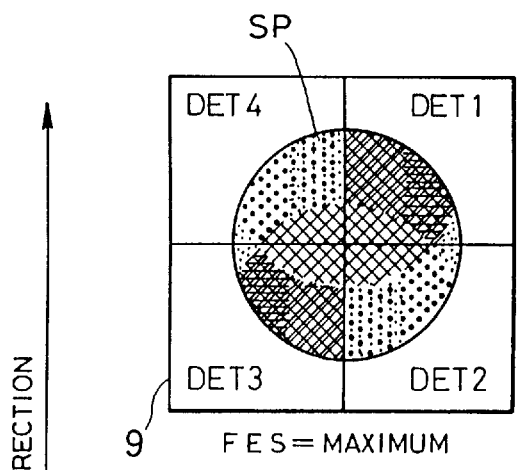
FIG.5A
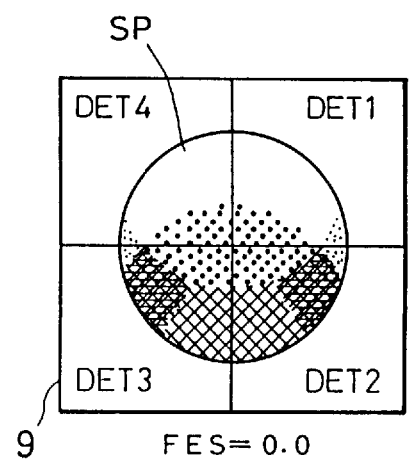
FIG.5B
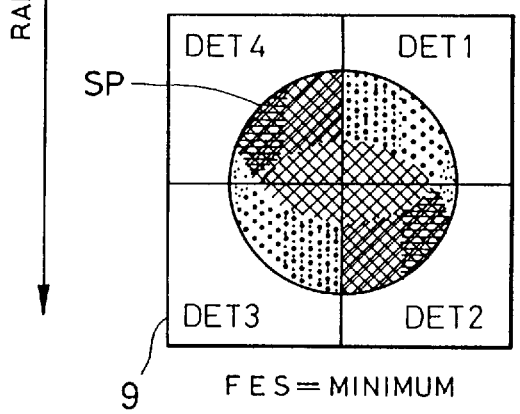
FIG.5C
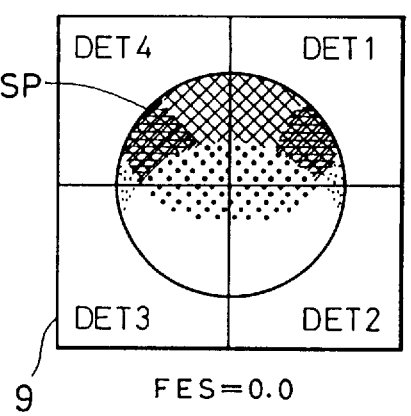
FIG.5D

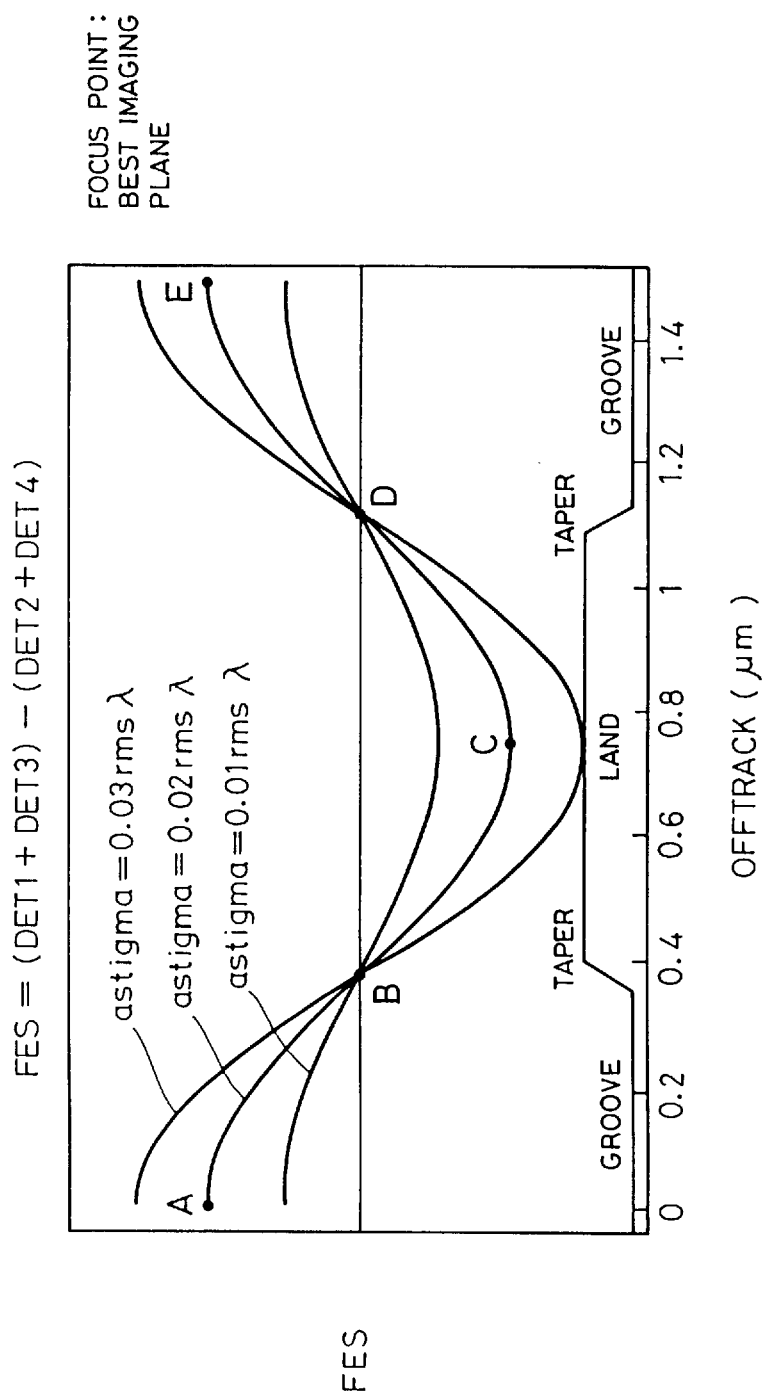

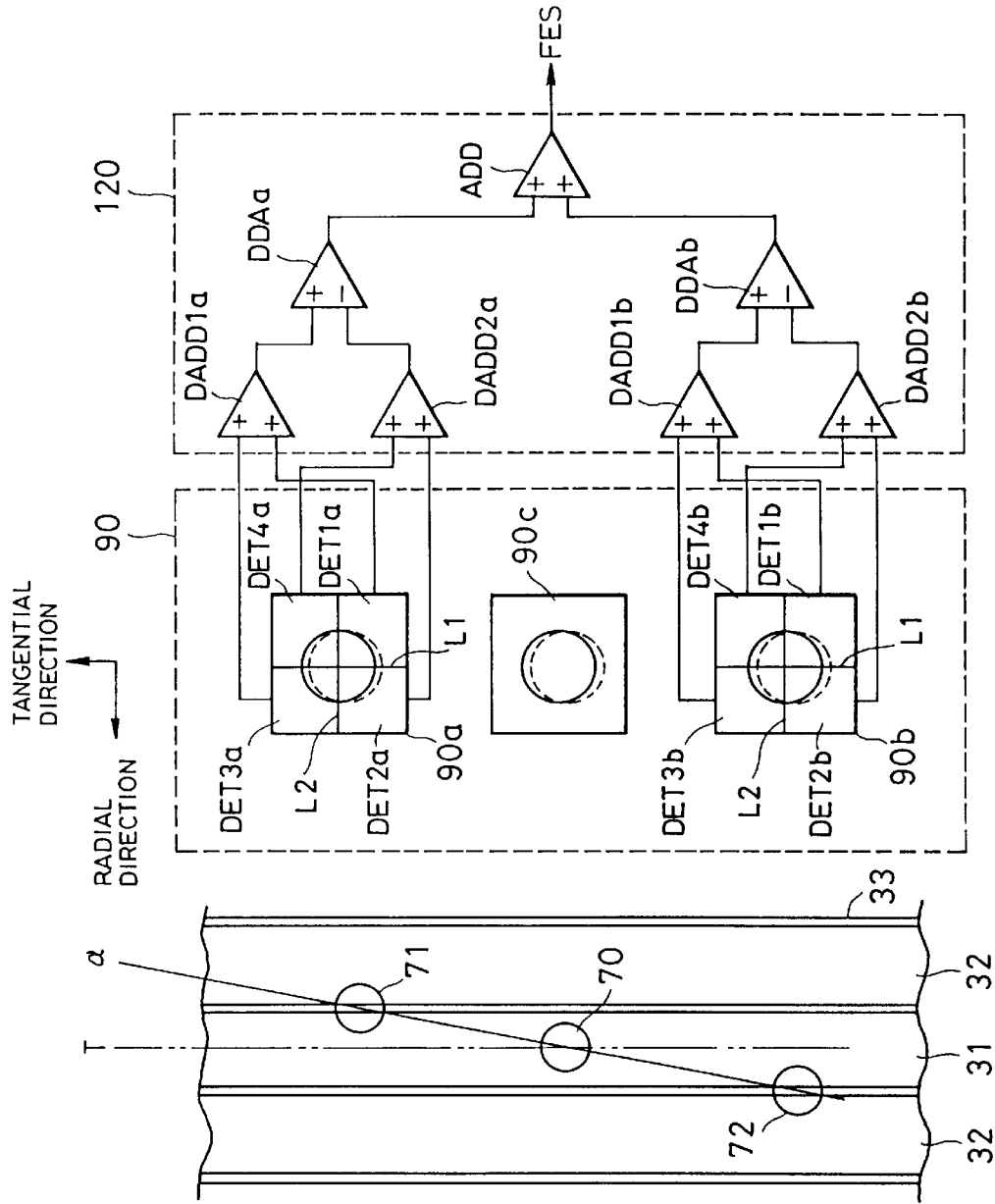

FIG. 13A
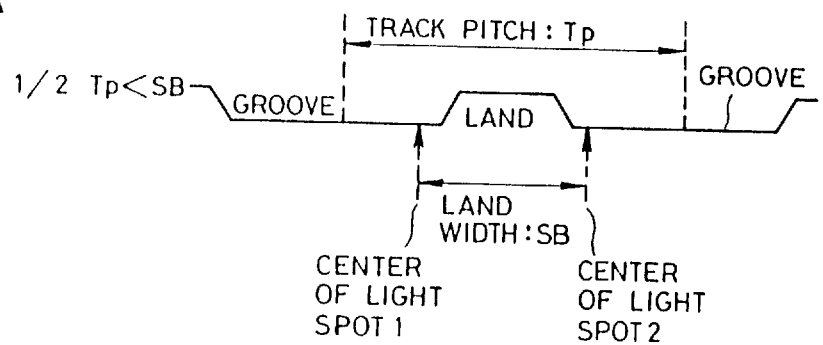
FIG. 13B  FIRST PRELIMINARY FES
FIG. 13C  SECOND PRELIMINARY FES
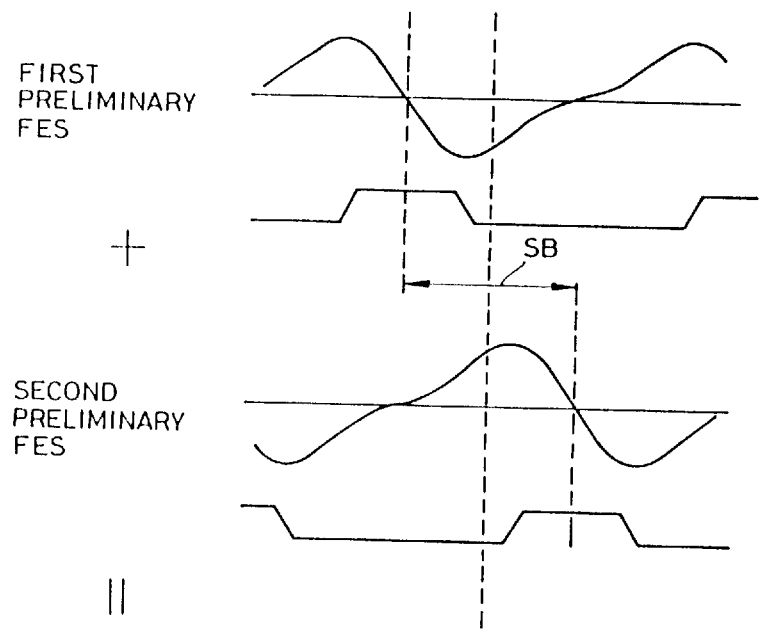
FIG. 13D  FES
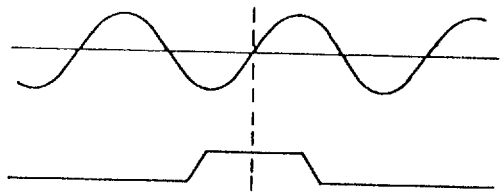

FIG. 13E
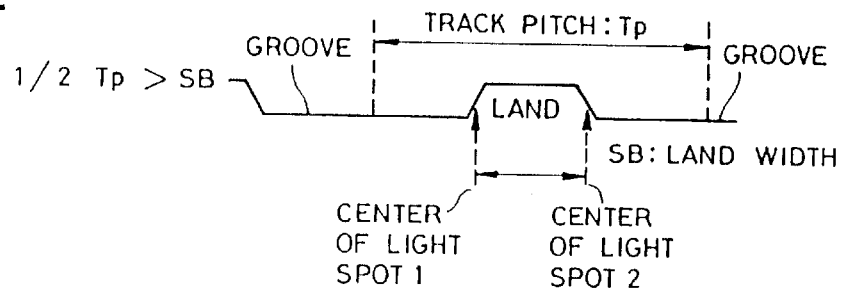
FIG. 13F FIRST PRELIMINARY FES
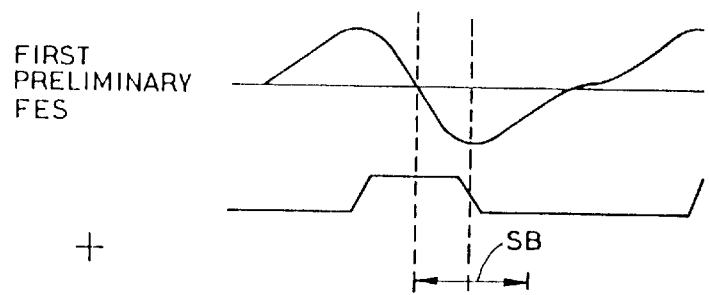
+
FIG. 13G SECOND PRELIMINARY FES
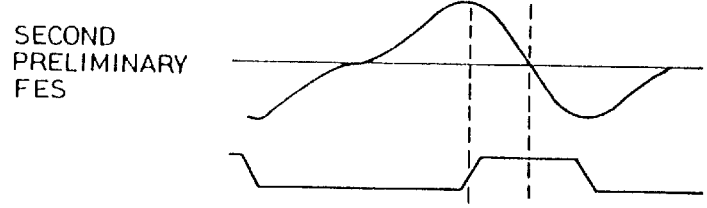
=
FIG. 13H FES
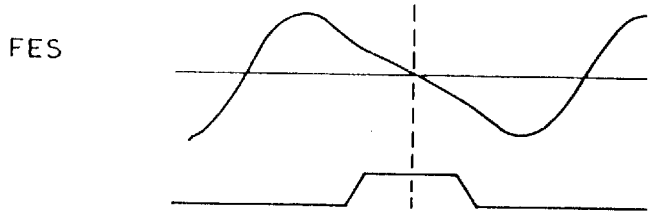

METHOD FOR GENERATING A FOCUS ERROR SIGNAL DUE TO ASTIGMATISM AND OPTICAL PICKUP DEVICE USING THE SAME

BACKGROUND OF THE INVENTION

1. Field of the Invention

The present invention relates generally to an optical pickup device for use in an optical information recording/reproducing apparatus, and more particularly, to an optical pickup including a focus error detecting circuit using an astigmatism method.

2. Description of the Related Art

For a recording/reproducing apparatus for recording/reproducing information on an optical disc, loaded therein, such as an optical video disc, a digital audio disc, and so on, a focus servo and a tracking servo are essential for always accurately converging light beams for writing and reading information to a pit train or the like formed spirally or concentrically on a recording surface of the optical disc. The focus servo performs a positional control for an objective lens, used to irradiate a pit train on the optical disc with light beams, in an optical axis direction so as to reduce a focus error, i. e., an error of the position of the objective lens in the optical axis direction with respect to the focus position of the objective lens. The tracking servo performs a positional control for the position of the objective lens, used to irradiate a pit train on the optical disc with light beams, with respect to a recording track in a radial direction of the optical disc, so as to reduce a tracking error, i. e., an error of the objective lens with respect to the pit train recording track position.

FIG. 1 illustrates a conventional optical pickup device using the astigmatism method.

A laser beam from a semiconductor laser 1 is transformed into a parallel laser beam by a collimator lens 2, passes through a polarizing beam splitter 3, and is converged by an objective lens 4 toward an optical disc 5 to form a light spot onto a pit train on an information recording surface of the optical disc 5. Light reflected from the optical disc 5 is converged by the objective lens 4 and directed by a beam splitter 3 to a detecting lens 7. Converged light formed by the detecting lens 7 passes through a cylindrical lens 8, serving as an astigmatism generating element, to form a spot image near the center 'O' of a light receiving surface of a quadrant photodetector 9 having four light receiving surface areas (elements) divided by two orthogonal line segments. The cylindrical lens 8 irradiates the quadrant photodetector 9 with a light spot SP in the shape of true circle as illustrated in FIG. 2A when the laser beam is converged on the recording surface of the optical disc 5 in focus, and an elliptic light spot SP, extending in an orthogonal direction of the elements as illustrated in FIG. 2B or 2C when the converged laser beam is out of focus on the recording surface of the optical disc 5 (FIG. 2B illustrates the light spot SP when the objective lens 4 is too far from the optical disc 5, while FIG. 2C illustrates the light spot SP when the objective lens 4 is too near the optical disc 5), thus generating so-called astigmatism.

The quadrant photodetector 9 opto-electrically transduces the light spot irradiated to the four light receiving surface areas into respective electric signals which are supplied to a focus error detecting circuit 12. The focus error detecting circuit 12 generates a focus error signal (FES) based on the electric signals supplied from the quadrant photodetector 9 and supplies the focus error signal to an actuator driver circuit 13. The actuator driver circuit 13 supplies a focusing driving signal to an actuator 15. The actuator 15 moves the objective lens 4 in response to the focusing driving signal in the optical axis direction.

The focus error detecting circuit 12, as illustrated in FIG. 3, is connected to the quadrant photodetector 9, where the quadrant photodetector 9 is composed of four detecting elements DET1 to DET4 in first to fourth quadrants which are located adjacent to each other with two orthogonal division lines L1 and L2 interposed therebetween and which are independent of each other. The quadrant photodetector 9 is positioned such that the division line L2 is in parallel with a tangential direction with respect to the extending direction of the recording track, and the other division line L1 is in parallel with the radial direction of the same. Respective opto-electrically transduced outputs from the elements DET1 and DET3, symmetric with respect to the center 'O' of the light receiving surface of the quadrant photodetector 9, are added by an adder 22, while respective opto-electrically transduced outputs from the elements DET2 and DET4, also symmetric with respect to the center 'O' of the light receiving surface, are added by an adder 21, and outputs from the respective adders 21 and 22 are supplied to a differential amplifier 23. The differential amplifier 23 calculates the difference between the supplied signals, and outputs a signal indicative of the difference therebetween as a focus error signal (FES).

As described above, in the conventional focus error detecting circuit 12, the outputs of the quadrant photodetector 9 are added by the adders 21 and 22, respectively, and the differential amplifier 23 calculates the difference between the outputs of the adders 21 and 22 to generate a focus error component. In this event, when the light beam is in focus, the light spot in the shape of true circle as illustrated in FIG. 2A is formed on the quadrant photodetector 9, where a spot intensity distribution is symmetric with respect to the center 'O' of the light receiving surface of the quadrant photodetector 9, i. e., symmetric in the tangential direction and in the radial direction, so that the values resulting from the additions of the opto-electrically transduced outputs from the elements on the diagonals are equal to each other, with the focus error component being calculated to be "zero". On the other hand, when the light beam is out of focus, i. e., an elliptic light spot extending in a diagonal direction as illustrated in FIG. 2B or 2C is formed on the quadrant photodetector 9, so that the values resulting from the additions of the opto-electrically transduced outputs from the elements on the diagonals are different from each other. Thus, the focus error component output from the differential amplifier 23 exhibits a value corresponding to the focus error. Specifically, assuming that the references designated to the elements of the quadrant photodetector 9 represent the outputs thereof, the focus error signal FES is expressed by the following equation:

$$FES=(DET1+DET3)-(DET2+DET4)$$

However, it is actually difficult to perfectly remove astigmatism in the conventional optical pickup device utilizing the astigmatism method, although optical elements (including a laser diode as a light source) are designed so that any further other astigmatism does not occur. In addition, birefringence of the substrate of the optical disc generates astigmatism. For example, the birefringence in the disc substrate made of polycarbonate (PC) generates astigmatism in the direction extending at the angle of 45 degree with respect to a tangential (track) or radial direction. In this case, when the conventional optical pickup device detects a focus error signal FES from the optical disc having a lands and a groove formed on an information recording surface thereof, the FES includes a noise during the crossing of the light spot over the tracks. This is because the astigmatism is changed in response to the variation of optical path in the substrate cased by the difference in the focus position of the light beam between the land and groove.

Further more, there may be sometimes an offset of the optical axis of the light spot from the center 'O' of the light receiving surface in the tangential direction due to an error associated with the manufacturing of the pickup as indicated in the broken line shown in FIG. 3. If an offset is present in the optical axis of the beam spot in the tangential direction or there are another astigmatism in the optics and birefringence in the disc substrate, then the focus error signal FES does include noise. Such a noise is hereinafter called an "FES noise".

Since a conventional CD player has employed an objective lens having a small numerical aperture NA and a large focus depth, the noise more or less included in the focus error signal (FES) has not caused any problem as a focus error. However, when information is read from a recently developed optical disc having pregrooves such as DVD-RAM or the like, an objective lens having a large numerical aperture and a small focus depth is employed for purposes of reading information, so that the noise included in the focus error signal exerts larger influences on the focus servo for the objective lens.

This may cause a focus servo system to fail to follow the noise in an optical pickup device adapted to read information from an optical disc having pregrooves, resulting in oscillation of a circuit associated with the focus servo system.

SUMMARY OF THE INVENTION

The present invention has been made in view of the problem mentioned above, and its object is to provide an astigmatism focus error signal generating method and an optical pickup device which are capable of favorably eliminating of, from a focus error signal, noise possibly generated when a beam spot traverses tracks or lands and grooves in the astigmatism method, in particular, noise components possibly caused by an offset of the optical axis of a beam spot in the tangential direction, i. e., an offset of the optical axis from the center of a light receiving surface of a quadrant photodetector, or a further astigmatism in the optical system or birefringence of the substrate of the optical disc.

The present invention provides, in one aspect, a method for generating a focus error signal in an optical pickup device which comprising the steps of:

providing an irradiation optics for irradiating laser beams as at least two light spots onto an information recording surface of an optical disc on which a land and a groove are spirally or concentrically formed;

providing first and second photodetectors each including a light receiving surface for receiving the reflected light and divided into first to fourth quadrants defined in a tangential direction and in a radial direction from the center of the light receiving surface as at least four elements positioned in a centrally symmetric relationship with respect to the center of the light receiving surface within the first to fourth quadrants;

providing a photodetection optics having an astigmatism generating element for applying astigmatism to light reflected from said light spots of the information recording surface and introducing the reflected lights into said first and second photodetectors respectively;

scanning said two light spots along the land or groove while maintaining the distance between the light spots in such a manner that the distance between the centers of said two light spots in a radial direction of said optical disc is one half of the track pitch;

generating a first preliminary focus error signal calculated as an output difference between an addition output of one pair of said elements placed on centrally symmetric positions of said photodetector and an addition output of the other pair of said elements placed on centrally symmetric positions in said first photodetector;

generating a second preliminary focus error signal calculated as an output difference between an addition output of one pair of said elements placed on centrally symmetric positions of said photodetector and an addition output of the other pair of said elements placed on centrally symmetric positions in said second photodetector; and generating a focus error signal calculated as the addition of said first and second preliminary focus error signals.

According to the astigmatism focus error signal generating method of the invention, since the first and second preliminary focus error signals which are in reverse phase can be added to each other, it is possible to favorably remove, from a focus error signal, noise components due to both an offset of the optical axis of a beam spot from the center of the light receiving surface of the quadrant photodetector and a further astigmatism in the optics and/or birefringence of the optical disc substrate.

In the astigmatism focus error signal generating method, the irradiation of two light spots is point symmetrically performed with respect to the middle point of the distance between the light spot centers, particularly, the two light spots are irradiated onto the disc in such a manner that a radial direction component in the distance between the centers of the two light spots is kept one half of the track pitch of the disc, so that the first and second preliminary focus error signals are maintained in reverse phase.

In another aspect of the invention, the present invention provides an optical pickup device comprising:

an irradiation optics for irradiating laser beams as at least two light spots onto an information recording surface of an optical disc on which a land and a groove are spirally or concentrically formed and scanning said two light spots along the land or groove while maintaining the distance between the light spots in such a manner that the distance between the centers of said two light spots in a radial direction of said optical disc is one half of the track pitch;

first and second photodetectors each including a light receiving surface for receiving reflected light and divided into first to fourth quadrants defined in a tangential direction and in a radial direction from the center of the light receiving surface as at least four elements positioned in a centrally symmetric relationship with respect to the center of the light receiving surface within the first to fourth quadrants;

a photodetection optics having an astigmatism generating element for applying astigmatism to light reflected from said light spots of the information recording surface and introducing the reflected lights into said first and second photodetectors respectively;

first and second photodetecting means for generating first and second preliminary focus error signals respectively each including;

a first diagonal adding means connected to the first and third quadrant elements on centrally symmetric positions of said photodetector for adding outputs of said elements;

second diagonal adding means connected to second and fourth quadrant elements on centrally symmetric positions of said photodetector for adding outputs of said elements; and diagonal differential means connected to said first and second diagonal adding means for generating an output difference between outputs of said diagonal adding means as the first or second preliminary focus error signal; and diagonal adding means connected to the pair of diagonal differential means of the first and second photodetecting-means for adding outputs of the first and second preliminary focus error signals.

According to the optical pickup device of the invention, since the first and second preliminary focus error signals which are in reverse phase can be added to each other, it is possible to favorably remove, from a focus error signal, noise components due to both an offset of the optical axis of a beam spot from the center of the light receiving surface of the quadrant photodetector and a further astigmatism in the optics and/or birefringence of the optical disc substrate.

In optical pickup device, said irradiation optics may further comprise a diffraction grating element which generates plus and minus first order lights of the laser beams for said two light spots irradiated in a point symmetry with respect to the middle point of the distance between the light spots, thereby maintaining the point symmetry, so that the first and second preliminary focus error signals are maintained in reverse phase.

Moreover, in the optical pickup device above mentioned, said diffraction grating element may further comprise rotation adjustment means for rotating said diffraction grating element about the optical axis thereof to adjust a radial direction component in the distance between the centers of said two light spots to one half of the track pitch. Therefore, it facilitates to easily set the fittest positions of the two beam spots so that the first and second preliminary focus error signals becomes in reverse phase.

In addition, in the optical pickup device above mentioned, said astigmatism generating element may be a cylindrical lens, a hologram element or a parallel transparent plate. Therefore, the optical pickup device is simplified in the structure.

BRIEF DESCRIPTION OF THE DRAWINGS

FIG. 1 is a schematic diagram illustrating the structure of an optical pickup device;

FIGS. 2A, 2B and 2C are plan views illustrating variations in shape of a beam spot on a light receiving surface of a photodetector;

FIGS. 5A, 5B, 5C and 5D are plan views each illustrating a beam spot intensity distribution on the light receiving surface of the photodetector in the conventional optical pickup device, which is caused by a reflected light with astigmatism due to birefringence of the disc substrate during an off-track state;

FIG. 6 is a graph illustrating the characteristics of FES noise versus an offset of the optical axis of a beam spot with respect to a track in a conventional optical pickup device, which is caused by a reflected light with astigmatism due to birefringence of the disc substrate during an off-track state and including a partially cross-sectional view of the optical disc at the bottom of the graph;

FIG. 11A is an enlarged plan view illustrating an optical disc in which three beam spots move on the information recording surface of the optical disc;

FIG. 11B is a block diagram illustrating a focus error signal generator in an embodiment of the present invention together with the configuration of the photodetectors corresponding to beam spots moving on the information recording surface;

FIGS. 13AA is a partially cross-sectional view of the optical disc in which the radial direction component SB of the distance between the centers of the two light spots is one half or more of the track pitch;

FIGS. 13AB to 13AD are graphs illustrating characteristics of the first and second preliminary FESs and the FES respectively in the off-track state of an optical pickup device of an embodiment of the present invention in which the radial direction component SB of the distance between the centers of the two light spots is one half or more of the track pitch;

FIGS. 13BA are partially cross-sectional views of the optical discs in which the radial direction component SB of the distance between the centers of the two light spots is one half or less of the track pitch;

FIGS. 13BB to 13BD are graphs illustrating characteristics of the first and second preliminary FESs and the FES respectively in the off-track state of an optical pickup device of an embodiment of the present invention in which the radial direction component SB of the distance between the centers of the two light spots is one half or less of the track pitch.

DESCRIPTION OF THE PREFERRED EMBODIMENTS

The present invention will hereinafter be described in conjunction with preferred embodiments thereof with reference to the accompanying drawings. The present inventors have first studied the FES noise which may be multiplexed on a focus error signal in an optical pickup device which is moved in the radial direction that a beam spot traverses a track or a land and a groove, particularly, the noise caused by astigmatism in the optics and birefringence of the disc substrate due to the offset of the beam spot optical axis in a tangential direction on an optical disc having the groove and land formed on the information recording surface.

Figure 3:
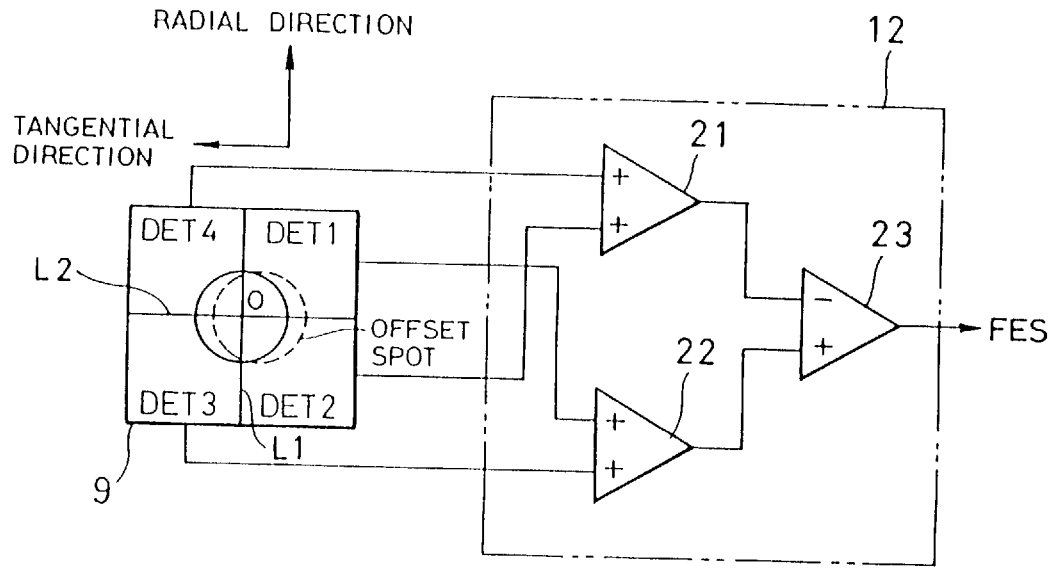
FIG. 3 is a schematic block diagram illustrating a focus error signal generator in a conventional optical pickup device.
Figure 4:
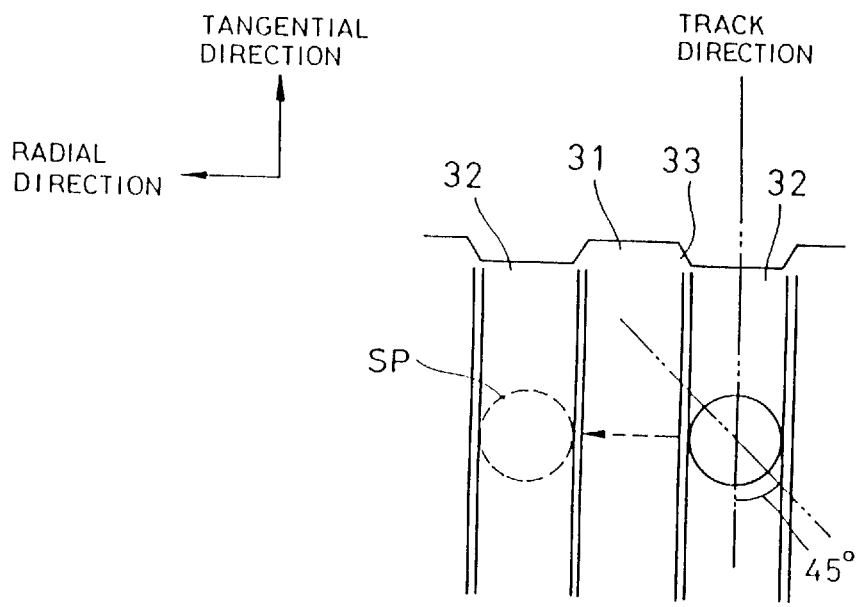
FIG. 4 is an enlarged plan view illustrating an optical disc in which a beam spot moving on the information recording surface and including a partially cross-sectional view of the optical disc.

First, as shown in FIG. 4, the laser beam is irradiated as a light spot SP on lands 31 and grooves 32 spirally or concentrically formed on an information recording surface of an optical disc. The light spot SP is moved in the radial direction of irradiation optics shown in a broken line. Thus, FES noise in a focus error signal is measured. In this case, the disc substrate made of polycarbonate (PC) is used for a DVD-RAM of the optical disc in which astigmatism occurs due to birefringence at the angle of 45 degree with respect to a track direction. This optical disc has a groove and a land which are equal in the width to each other.

In case that a light spot moves in the radial direction of the disc, a light spot intensity distribution is produced as illustrated in FIG. 5A when the center of the spot passes near a tapered boundary between the groove and land. From the aforementioned equation for calculating the focus error signal, FES=(DET1+DET3)−(DET2+DET4), it can be seen that the FES becomes maximum in the situation illustrated in FIG. 5A. When the spot further moves and reaches near the center of the land, a spot light intensity distribution is produced as illustrated in FIG. 5B, where the FES is zero. When the spot further moves and passes near a tapered boundary between the land and groove, a spot light intensity distribution is produced as illustrated in FIG. 5C, where the FES becomes minimum. When the spot further moves and reaches near the center of the groove, a spot light intensity distribution is produced again as illustrated in FIG. 5D, where the FES is zero. These fluctuations in FES contribute to the generation of the FES noise.

Thus, the FES is calculated using the DVD-RAM having the groove and land formed thereon. Conditions applied to the calculations are as follows:

Numerical aperture of objective lens: NA=0.60;
Wavelength of laser: $\lambda$=0.635 $\mu$m;
Track pitch: $t_p$=1.48 $\mu$m;
Groove depth: $g_d$=0.067 $\mu$m;
Groove width: $g_w$=0.74 $\mu$m;
Groove taper width: $g_{tw}$=0.174 $\mu$m; and Astigmatism at the angle of 45 degree with respect to a track direction 'astigma'=0.01 rms$\lambda$, 'astigma'=0.02 rms$\lambda$, and 'astigma'=0.03 rms$\lambda$.

FIG. 6 shows the results of the calculations for deriving the FES from the aforementioned equation FES=(DET1+DET3)−(DET2+DET4) with respect to an off-track of the center of a spot from the center of a groove, when the center of a spot, focused at the best imaging point, traverses the grooves and lands on an optical disc. It should be noted that no recording pits are formed in the grooves and lands on the optical disc. The configuration of a portion of the optical disc including the grooves and lands is also illustrated in cross-section along the abscissa of the graph. Points A, B, C and D correspond to the spot light intensity distributions previously illustrated in FIGS. 5A, 5B, 5C and 5D respectively.

The FES should be essentially zero when the spot traverses the groove and the land since the spot is in just focus. However it can be seen from the results shown in FIG. 6 that the FES is not zero but swings between a maximum value and a minimum value over tapered boundaries between the grooves and lands, because birefringence is caused by astigmatism exists at the angle of 45 degree direction with respect to a track direction.

In this way, It can be seen that astigmatism occurs in a specific direction. When the light spot radially travelling includes a moving component in the direction of angle of 45 degree with respect to a track direction, a focus position of the irradiated light varies at the lands and grooves of the disc to change the optical path, and then FES noise occurs during the crossing of the light spot over the tracks. The above graphs prove that there are some FES noises due to astigmatism.

For example, the equation "astigma"=0.02 rms$\lambda$ implies that the component of astigmatism generated in the optics or the disc is equal to 0.02$\lambda$ as a rms value in the direction of angle of 45 degree with respect to a track direction.

Figure 7:
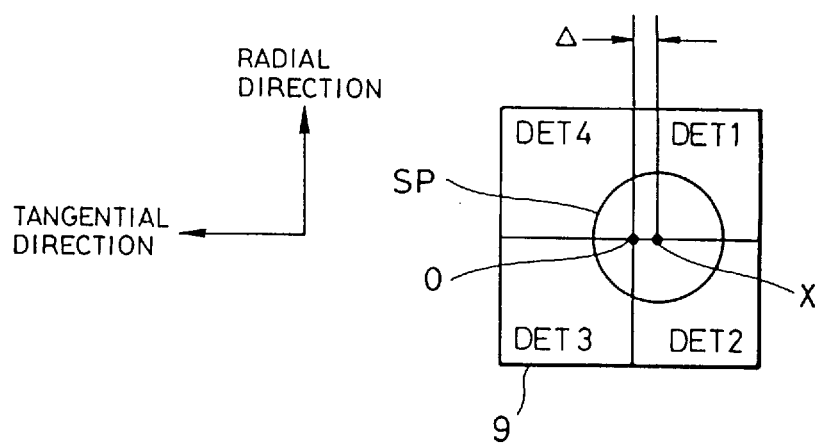
FIG. 7 is a plan view illustrating a beam spot in an off track state when the optical axis of the beam spot on the light receiving surface of the photodetector is offset from the center of the light receiving surface in the tangential direction.

Secondly, the present inventors have studied the FES noise which may be multiplexed on a focus error signal in an optical pickup device which is moved in the radial direction when an offset 'delta' is present in the optical axis of a spot, that is, when the optical axis 'X' of the spot in the tangential direction is offset from the center 'O' of a light receiving surface of a quadrant photodetector, as illustrated in FIG. 7, on an optical disc having grooves and lands formed on an information recording surface. In this case, a DVD-RAM optical disc having grooves and lands is used which comprises a disc substrate made of polymethyl methacrylates (PMMA) in which birefringence hardly occurs.

Figure 8:
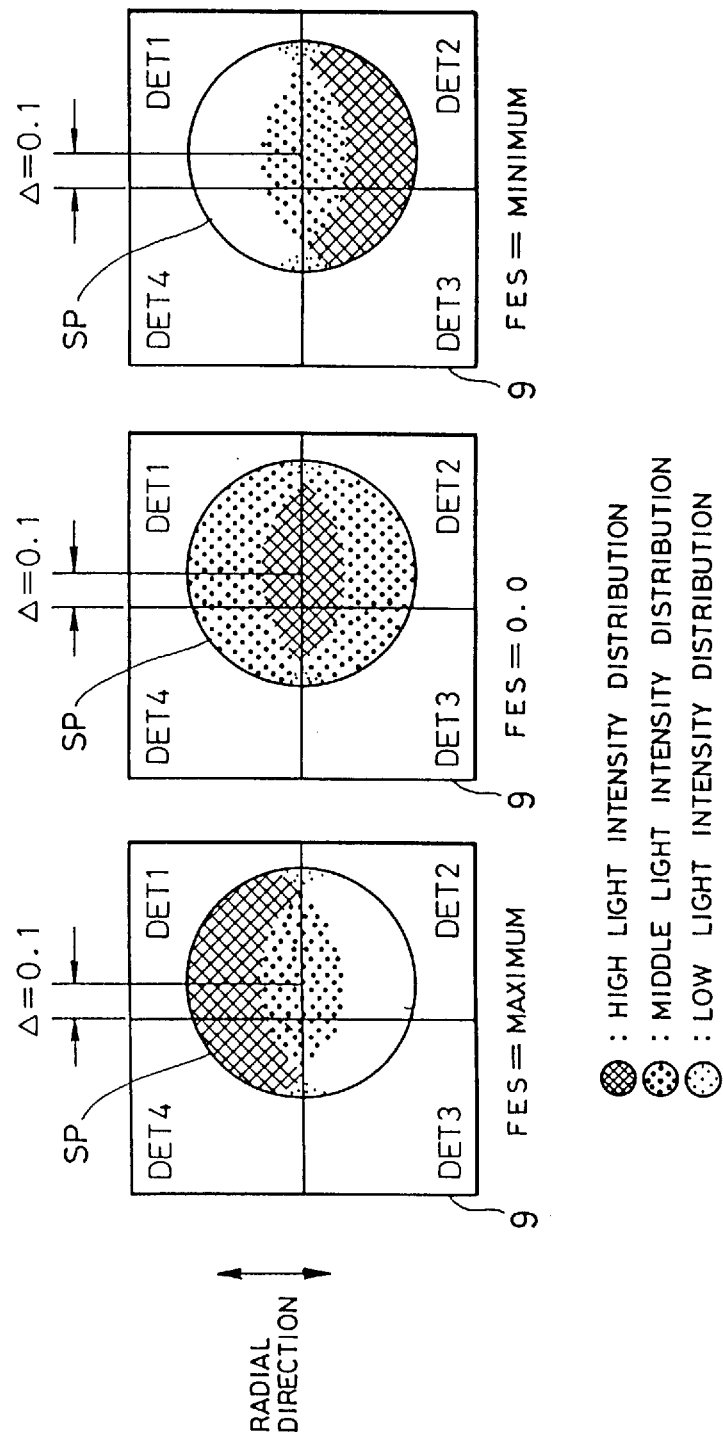
FIGS. 8A, 8B and 8C are plan views each illustrating a beam spot intensity distribution on the light receiving surface of the photodetector in a tangential direction in the conventional optical pickup device, which is caused by a reflected light with astigmatism due to birefringence of the disc substrate during an off-track state.

Assume herein that the diameter of a spot on the quadrant photodetector illustrated in FIG. 7 is one, and an offset 'delta' of the optical axis, which is the distance from the center 'O' of the light receiving surface to the optical axis 'X' of the spot, normalized with the diameter of the spot, is for example 0.1. Even if the spot is focused at a groove as illustrated in FIG. 8B, a light spot intensity distribution as illustrated in FIG. 8A is produced when the center of the spot, moving in the radial direction, passes near a tapered boundary of a groove and a land. From the aforementioned equation for calculating the focus error signal, FES=(DET1+DET3)−(DET2+DET4), it can be seen that the FES becomes maximum in the situation illustrated in FIG. 8A. When the spot further moves and reaches near the center of the land, a spot light intensity distribution as illustrated in FIG. 8B is produced again, where the FES is zero. When the spot further moves and passes near a tapered boundary between the land and groove, a spot light intensity distribution as illustrated in FIG. 8C is produced, where the FES becomes minimum. When the spot further moves and reaches near the center of the groove, a spot light intensity distribution is produced again as illustrated in FIG. 8B, where the FES is zero. These fluctuations in FES contribute to the generation of the FES noise.

Thus, the FES is calculated using a DVD-RAM disc as an optical disc comprising grooves and lands formed thereon. Conditions applied to the calculations are the same as calculation conditions except offsets of the optical axis of a spot: 'delta'=0.05, 'delta'=0.10, and 'delta'=0.015.

Figure 9:
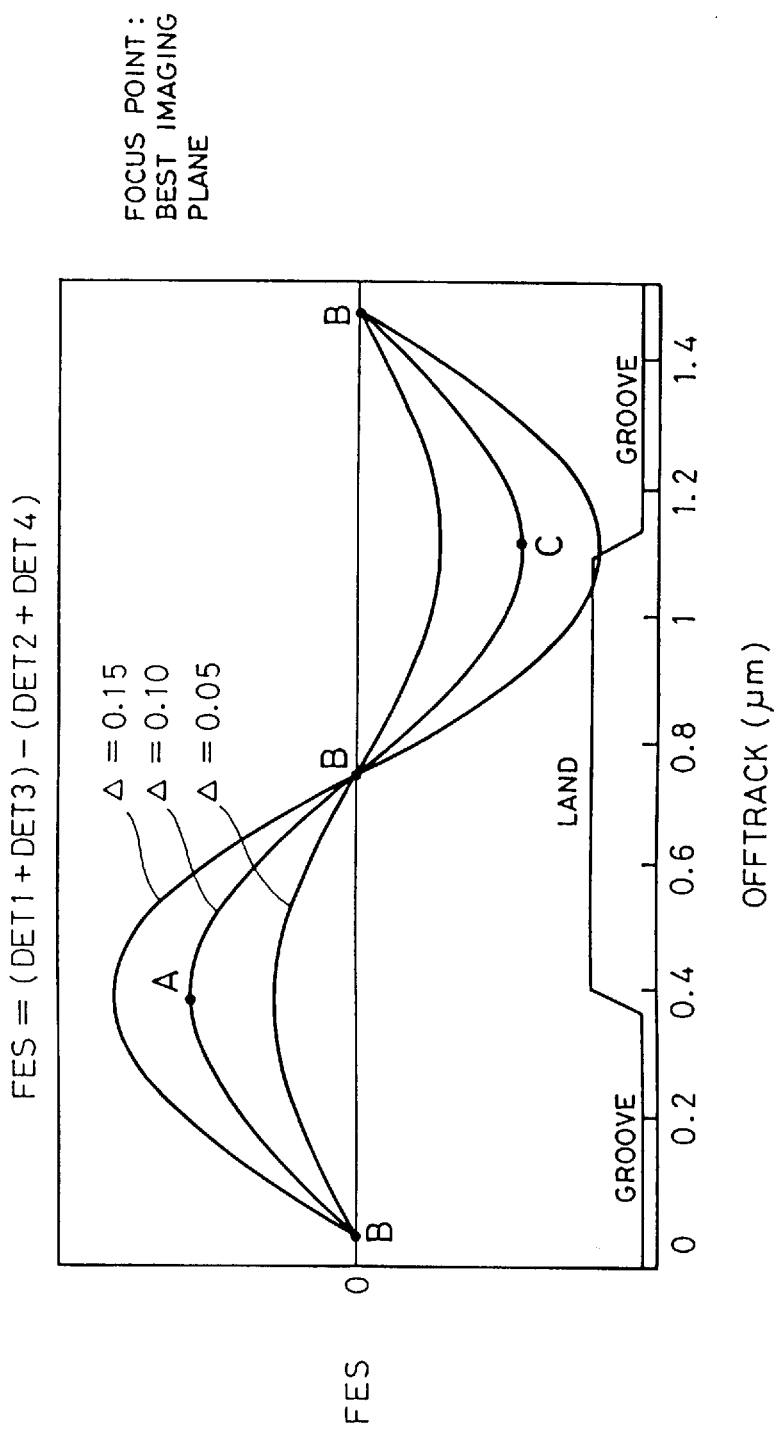
FIG. 9 is a graph illustrating the characteristics of FES noise versus an offset of the optical axis of a beam spot with respect to a track in an optical pickup device in the conventional optical pickup device and including a partially cross-sectional view of the optical disc at the bottom of the graph.

FIG. 9 shows the results of the calculations for deriving the FES from the aforementioned equation FES=(DET1+DET3)−(DET2+DET4) with respect to an off-track ($\mu$m) of the center of a spot from the center of a groove, when the center of a spot, focused at the best imaging point, traverses a groove and a land on an optical disc. It should be noted that no recording pits are formed in the grooves and lands on the optical disc. The configuration of a portion of the optical disc including grooves and lands is also illustrated in cross-section along the abscissa of the graph. Points A, B and C correspond to the spot light intensity distributions previously illustrated in FIGS. 8A, 8B and 8C, respectively.

It can be seen from these results that the FES should be essentially zero when the spot traverses the groove and the land since the spot is in focus, however, the FES is not zero but swings between a maximum value and a minimum value over tapered boundaries between the grooves and lands because 'delta' is not equal to 0 (zero).

To cope with the inconvenience mentioned above, the present inventors have devised the following device in accordance with one embodiment of the present invention for reducing a pp (peak-to-peak) value of the FES to a value nearest possible to zero.

Figure 10:
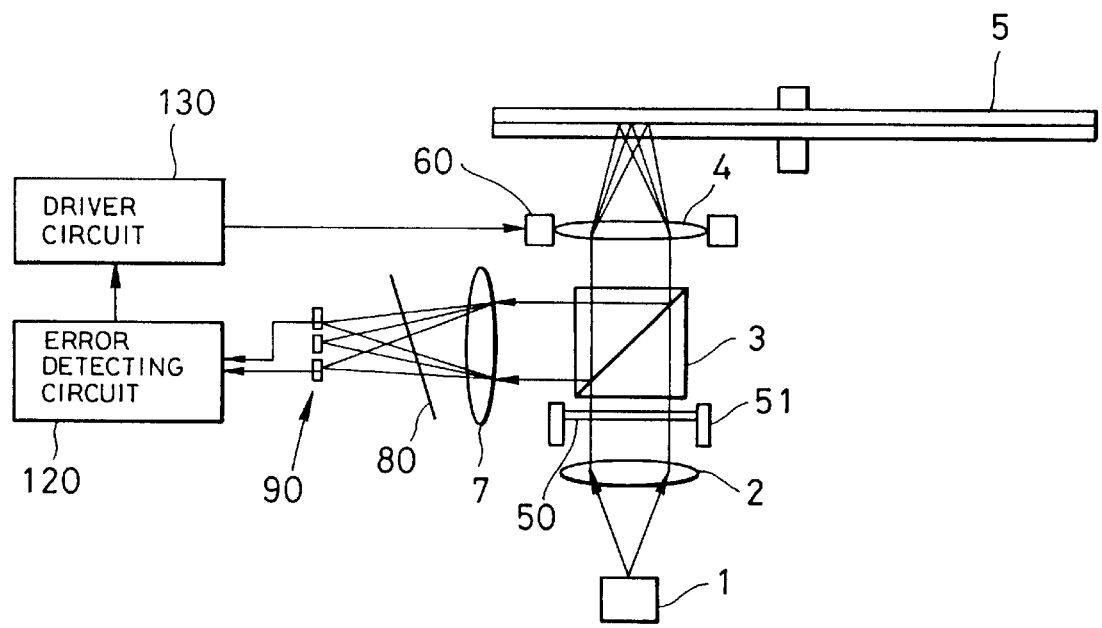
FIG. 10 is a schematic diagram illustrating the structure of an optical pickup device of an embodiment of the present invention.

FIG. 10 shows an optical pickup device with a three-beam system. The optical pickup device having a pickup body 1 includes a semiconductor laser 1 of a light source, a diffraction grating element 50 with regular interval pitches, a beam-splitter 3, a movable objective lens 4, a detection lens 7 an astigmatism generating element of a light-permeable parallel plate 80 and a photodetector 90 receiving light reflected from the spots on an optical disc. The light-permeable parallel plate 80 is disposed to be slanted with respect to the optical axis of the lens.

The diffraction grating element 50 is hold in a hollow cylindrical holder 51 and disposed at the end of the holder. The holder 51 is rotatable in its central axis in such a manner that the diffraction direction of the grating is rotated about the optical axis. The diffraction grating 50 divides a single light beam emitted from the semiconductor laser 1 into three beams of a zeroth order light and two first order lights of plus and minus by its diffraction effect. These three beams are introduced through the necessary optics (not totally shown) such as the beam-splitter 3, a wave plate, etc., and the objective lens 4 and then irradiated to the information recording surface of the optical disc 5. In the pickup body, there is provided with an objective-lens-driving mechanism 60 including a tracking actuator and a focusing actuator for the movable objective lens. This focusing actuator of the mechanism 60 moves the objective lens 4 in a direction perpendicular to the information recording surface of the optical disc 5. The tracking actuator of the objective-lens-driving mechanism 60 moves the objective lens 4 in a radius direction of the optical disc 5.

In this way, the irradiation optics is constructed to include the semiconductor laser 1, the diffraction grating 50, the beam splitter 3, the objective lens 4. On the other hand, the photodetection optics includes the objective lens 4, the beam splitter 3, the detection lens 7, the light-permeable parallel plate 80 and the photodetector 90.

As shown in FIG. 11A, both the 0-th order light spot 70 used for writing the data on the information recording surface and the plus and minus first order light spots 71 and 72 used for the focusing servo system are formed on the optical disc. Namely, by using the diffraction grating 50 having the even interval pitch, the three light spots as shown in FIG. 11A are formed. In this case, a straight line α passing through the centers of the light spots 70, 71 and 72 is substantially perpendicular to each line of stripes of the diffraction grating 50. The predetermined angle of the straight line α to the extending direction of track 'T' is defined by controlling the rotation of the grating holder 51 about the optical axis thereof. The position of three circular light spots 70, 71 and 72 are set so that, when the writing light spot 70 is positioned at the center of the track "T", e.g., a pregroove, the focusing servo light spots 71 and 72 are aligned apart from each other with a quarter of track pitch in the radius direction of the optical disc. In this way, the light spots are irradiated so as to maintain the spot 70 scanning in the track direction "T".

Reflected lights from the light spots 70, 71 and 72 (shown in FIG. 11A) on the information recording surface of the optical disc 5 enter through the objective lens 4 to the beam-splitter 3 as shown in FIG. 10. Then the beam-splitter 3 deflects the lights to the detection lens 7 which converges them through the astigmatism generating element of the light-permeable parallel plate 80 to the photodetector 90. In this way, the three spots of reflected lights are formed on the photodetectors 90a, 90b and 90c as shown in FIG. 11B.

The photodetector 90 includes a pair of four-divided type photosensitive portions 90a and 90b receiving the reflected lights from the light spots 71 and 72 used for the focus servo control and a photosensitive portion 90c receiving the reflected light from the writing light spot 70. The outputs of the four-divided type photosensitive portions 90a and 90b are provided to a focus error detecting circuit 120 which is connected to the photodetector 90. A resultant of FES in the focus error detecting circuit 120 is provided to an objective lens driving circuit 130 which is connected to the detecting circuit 120. The driving circuit 130 controls to drive a focus servo actuator (including an electromagnetic coil) 60. If the photosensitive portion 90c includes a two-divided in the tangential direction photodetectors then the tracking servo push-pull signal is obtained.

The quadrant photodetector 90a is composed of four light receiving surface elements DET1a to DET4a, corresponding to first to fourth quadrants as shown in FIG. 11B, which are located adjacent to each other with two orthogonal division lines L1 and L2 interposed therebetween and which are independent of each other in the image plane formed by the light reflected from the light spot 71. The quadrant photodetectors 90a is positioned within the optical pickup device such that the division line L1 is in parallel with a tangential direction with respect to the extending direction of the recording track, and the other division line L2 is in parallel with the radial direction of the same. Similarly, the quadrant photodetector 90b is composed of four light receiving surface elements DET1b to DET4b in the image plane formed by the light reflected from the light spot 72. The quadrant photodetectors 90b is also positioned within the optical pickup device.

The focus error detecting circuit 120 is composed of a first and a second photodetecting means. The first photodetecting means comprises: a first diagonal adder DADD1a connected to the first and third quadrant elements DET1a and DET3a positioned on a diagonal of the quadrant photodetector 90a for adding outputs of these elements; a second diagonal adder DADD2a connected to the second and fourth quadrant elements DET2a and DET4a positioned on the other diagonal of the quadrature photodetector 90a for adding outputs of these elements; and a first diagonal differential amplifier DDAa connected to the first and second diagonal adders DADD1a and DADD2a for generating an output difference between outputs of the diagonal adders DADD1a and DADD2a as a first preliminary focus error signal.

Further, the focus error detecting circuit 120 also includes the second photodetecting-means comprising: a first diagonal adder DADD1b connected to the first and third quadrant elements DET1b and DET3b positioned on a diagonal of the quadrant photodetector 90b for adding outputs of these elements; a second diagonal adder DADD2b connected to the second and fourth quadrant elements DET2b and DET4b positioned on the other diagonal of the quadrature photodetector 90b for adding outputs of these elements; and a second diagonal differential amplifier DDAb connected to the first and second diagonal adders DADD1b, DADD2b for generating an output difference between outputs of the diagonal adders DADD1b and DADD2b as a second preliminary focus error signal.

Moreover, the focus error detecting circuit 120 includes an adder ADD connected to the diagonal differential amplifiers DDAa and DDAb in the first and second photodetecting-means for adding outputs of these elements as a symmetrical adder means. The output of the adder ADD is FES.

Assuming that the references designated to the elements of the quadrant photodetectors 90a and 90b indicate their outputs respectively, the outputs of the first and second diagonal differential amplifiers DDAa and DDAb in the first and second photodetecting-means are expressed as {(DET1a+DET3a)−(DET2a+DET4a)} and {(DET1b+DET3b)−(DET2b+DET4b)} respectively. Therefore, the focus error signal FES output of the adder ADD is expressed by the following equation:

FES={(DET1a+DET3a)−(DET2a+DET4a)}+{(DET1b+DET3b)−(DET2b+DET4b)}

Figure 12A:
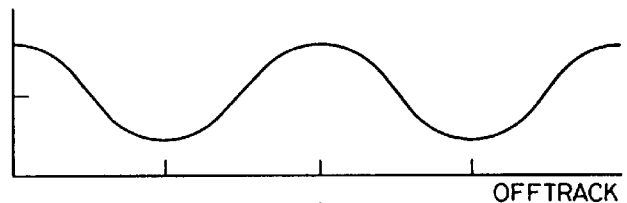
FIGS. 12A, 12B and 12C are graphs illustrating characteristics of a first and a second preliminary FESs and the FES respectively in the off-track state of an optical pickup device of an embodiment of the present invention.
Figure 12B:
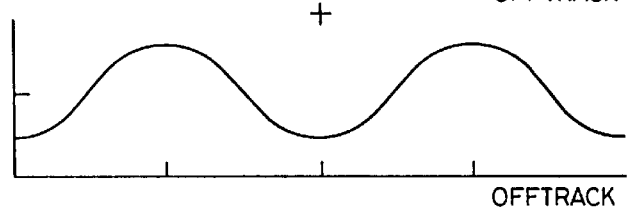
Figure 12C:
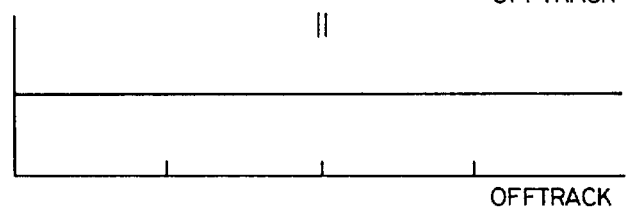

Furthermore, FIGS. 12A, 12B and 12C illustrates the waveforms of the outputs i.e., the first and second preliminary FESs of the first and second diagonal differential amplifiers DDAa and DDAb and the resultant FES generated by the adder ADD under the off-track state during the crossing over the grooves and the lands in a just focused position of the optical pickup device of the present invention, which are measured at the corresponding points in the detecting circuit 120. As seen from FIGS. 12A and 12B, the first and second preliminary focus error signals of the outputs of the diagonal differential amplifiers DDAa and DDAb, i.e., {(DET1a+DET3a)−(DET2a+DET4a)} and {(DET1b+DET3b)−(DET2b+DET4b)} are complement in symmetry, because the groove width and the land width are equal to each other. Therefore, when the first and second preliminary focus error signals shown in FIGS. 12A and 12B are added, the resultant focus error signal FES counteracted and smoothed as shown in FIG. 12C. From the FES caused by the addition of the first and second preliminary focus error signals, there are removed noise components due to both an offset of the optical axis of a beam spot from the center of the light receiving surface of the quadrant photodetector and a further astigmatism in the optics and/or birefringence of the optical disc substrate.

Thirdly, the present inventors have investigated the waveforms of the first and second preliminary focus error signals and the FES under the same conditions except that the groove width differs from the land width. That the groove width is larger than the land width. The distance between the centers of the two light spots in the radial direction of the disc is varied. As shown in FIG. 13A, when the radial direction component SB of the distance between the centers of the two light spots 1 and 2 is one half or more of the track pitch $t_p$, the centers of the two light spots 1 and 2 are positioned on the groove over the land and its tapers. Therefore, the first and second preliminary focus error signals 1 and 2 are not perfectly in reverse phase as shown in FIGS. 13AB and 13AC, so that the error noise remains more or less in the added signal or FES resultant as shown in FIG. 13AD. On the other hand, as shown in FIG. 13BA, when the radial direction component SB of the distance between the centers of the two light spots 1 and 2 is one half or less of the track pitch tp, e.g., the centers of the two light spots 1 and 2 are on the tapers so the SB is equal to the land width. In this case, the first and second preliminary focus error signals 1 and 2 are also not perfectly in reverse phase as shown in FIGS. 13BB and 13BC, so that the error noise remains more or less in the added signal or FES resultant as shown in FIG. 13BD. With comparison to from FIGS. 13AA to 13BD, when the distance in the radial direction between the centers of the two light spots 1 and 2 or a radial direction component SB is set up to one half of the track pitch, the FES noise amplitude is small. In addition, the distance in the radial direction between the centers of the two light spots 1 and 2 or a radial direction component SB may be changed with various values, e.g., one half of the track pitch the distance between the centers of the two light spots 1 and 2 in a radial direction is set to tp/2, the FES noise amplitude is small.

Therefore, the two laser beams are irradiated so that the distance between the centers is one half of the track pitch in a radial direction of the optical disc, while keeping the distance between the light spots and scanning an information recording surface of the optical disc. Even if the groove width and the land width are different from each other, then FES noise may be reduced.

Figure 14:
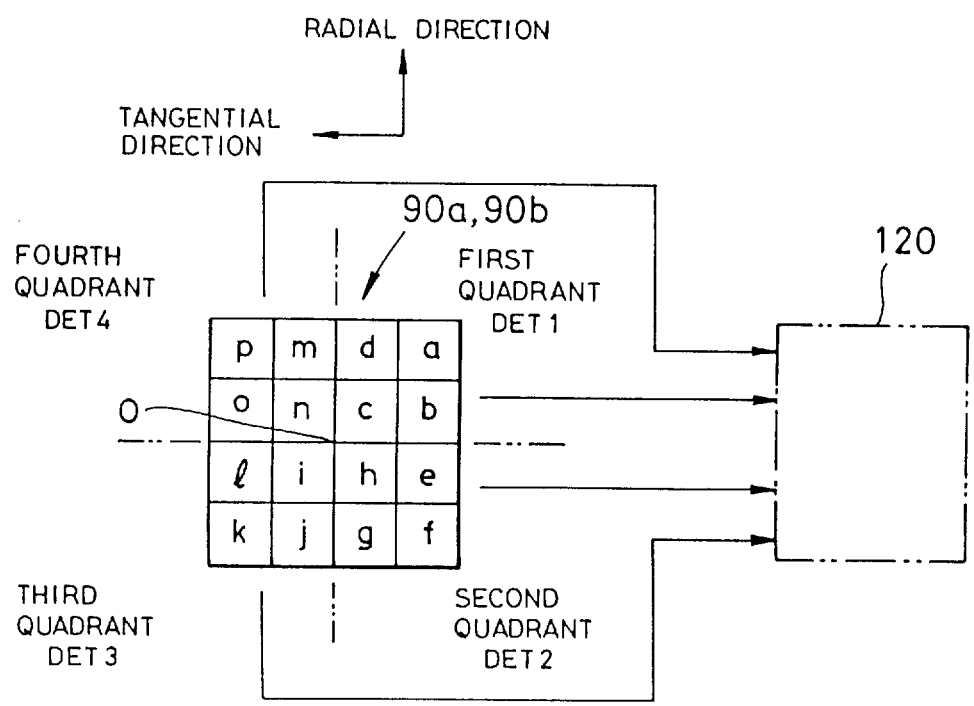
FIG. 14 is a plan view illustrating the light receiving surface of the photodetector in an optical pickup device of an embodiment of the present invention.

The device of the foregoing embodiment has been described as an optical pickup having an astigmatism generating element for applying astigmatism to light reflected from an information recording surface of an optical disc and a quadrant photodetector including a light receiving surface for receiving the reflected light, which is divided into four, i.e., first to fourth quadrant elements by two orthogonal lines passing the center of the light receiving surface. In another embodiment, any other photodetector than the quadrant photodetector may be used. For example, as illustrated in FIG. 14, each of photodetectors 90a and 90b may be divided into 16 elements 'a' to 'p' which are centrally symmetric with respect to the center '0' of the light receiving surface of each photodetector. It is apparent in this case that a focus error signal based on astigmatism can be generated in a manner similar to the foregoing embodiment by using total outputs of four blocks each composed of four elements 'a' to 'd', 'e' to 'h', 'i' to 'l' and 'm' to 'p' constituting first to fourth quadrants defined in the tangential direction and the radial direction or using outputs of elements 'c', 'h', 'i', 'n' within the 16 elements in accordance with the size of a light spot introduced to the center 'O' of the light receiving surface or the like, with the respective blocks or elements corresponded to the outputs of "DET1a to DET4a" and "DET1b to DET4b" of the equation for calculating the FES. In addition, a light detecting element equally divided into eight areas radially from the center of a light receiving surface may be used in place of the diced photodetector divided into 16 elements to generate a focus error signal based on astigmatism, in a manner similar to the foregoing embodiment, by corresponding appropriately combined elements to the outputs of "DET1a to DET4a" and "DET1b to DET4b" of in the equation for calculating the FES.

Further, while the pickup device of the foregoing embodiment has employed the light-permeable parallel plate 80 slanted to the optical axis of the optics as an astigmatism generating element as illustrated in FIG. 10, a holographic element having annular fringes, a parallel transparent flat plate, or the like may be used in place of the cylindrical lens.

According to the invention of the astigmatism focus error signal generating method and the optical pickup device, since the first and second preliminary focus error signals which are in reverse phase can be added to each other, it is possible to favorably remove, from a focus error signal, noise components due to both an offset of the optical axis of a beam spot from the center of the light receiving surface of the quadrant photodetector and a further astigmatism in the optics and/or birefringence of the optical disc substrate.

What is claimed is:

1. A method for generating a focus error signal in an optical pickup device which comprising the steps of:

providing an irradiation optics for irradiating laser beams as at least two light spots onto an information recording surface of an optical disc on which a land and a groove are spirally or concentrically formed;

providing first and second photodetectors each including a light receiving surface for receiving the reflected light and divided into first to fourth quadrants defined in a tangential direction and in a radial direction from the center of the light receiving surface as at least four elements positioned in a centrally symmetric relationship with respect to the center of the light receiving surface within the first to fourth quadrants;

providing a photodetection optics having an astigmatism generating element for applying astigmatism to light reflected from said light spots of the information recording surface and introducing the reflected lights into said first and second photodetectors respectively;

scanning said two light spots along the lands or grooves while maintaining the distance between the light spots in such a manner that the distance between the centers of said two light spots in a radial direction of said optical disc is one half of the track pitch;

generating a first preliminary focus error signal calculated as an output difference between an addition output of one pair of said elements placed on centrally symmetric positions of said photodetector and an addition output of the other pair of said elements placed on centrally symmetric positions in said first photodetector;

generating a second preliminary focus error signal calculated as an output difference between an addition output of one pair of said elements placed on centrally symmetric positions of said photodetector and an addition output of the other pair of said elements placed on centrally symmetric positions in said second photodetector; and generating a focus error signal calculated as the addition of said first and second preliminary focus error signals.

2. An astigmatism focus error signal generating method according to claim 1, wherein said two light spots are irradiated in a point symmetry with respect to the middle point of the distance between the light spots.

3. An astigmatism focus error signal generating method according to claim 2, wherein said two spots are irradiated and scanned in such a manner that each spot passes on a tapered boundary between the land and groove.

4. An optical pickup device comprising:

an irradiation optics for irradiating laser beams as at least two light spots onto an information recording surface of an optical disc on which a land and a groove are spirally or concentrically formed and scanning said two light spots along the lands or grooves while maintaining the distance between the light spots in such a manner that the distance between the centers of said two light spots in a radial direction of said optical disc is one half of the track pitch;

first and second photodetectors each including a light receiving surface for receiving reflected light and divided into first to fourth quadrants defined in a tangential direction and in a radial direction from the center of the light receiving surface as at least four elements positioned in a centrally symmetric relationship with respect to the center of the light receiving surface within the first to fourth quadrants;

a photodetection optics having an astigmatism generating element for applying astigmatism to light reflected from said light spots of the information recording surface and introducing the reflected lights into said first and second photodetectors respectively;

first and second photodetecting-means for generating first and second preliminary focus error signals respectively each including;

a first diagonal adding means connected to the first and third quadrant elements on centrally symmetric positions of said photodetector for adding outputs of said elements;

second diagonal adding means connected to second and fourth quadrant elements on centrally symmetric positions of said photodetector for adding outputs of said elements; and diagonal differential means connected to said first and second diagonal adding means for generating an output difference between outputs of said diagonal adding means as the first or second preliminary focus error signal; and diagonal adding means connected to the pair of diagonal differential means of the first and second photodetecting-means for adding outputs of the first and second preliminary focus error signals;

diffraction grating element.

5. An optical pickup device according to claim 4, wherein said irradiation optics further comprises a diffraction grating element which generates plus and minus first order lights of the laser beams for said two light spots irradiated in a point symmetry with respect to the middle point of the distance between the light spots.

6. An optical pickup device according to claim 4, wherein said diffraction grating element comprises rotation adjustment means for rotating said diffraction grating element about the optical axis thereof to adjust a radial direction component in the distance between the centers of said two light spots to one half of the track pitch.

7. An optical pickup device according to claim 4, wherein said astigmatism generating element may be a cylindrical lens, a hologram element or a parallel transparent plate.

* * * * *

UNITED STATES PATENT AND TRADEMARK OFFICE
CERTIFICATE OF CORRECTION

PATENT NO. : 5,856,959
DATED : Jan. 5, 1999
INVENTOR(S) : Takuma Yanagisawa

It is certified that error appears in the above-identified patent and that said Letters Patent is hereby corrected as shown below:

In col. 14, line 38, delete ";" and replace with a period.
In col. 14, line 39, delete "diffraction grating element".

Signed and Sealed this

Eighteenth Day of May, 1999

Attest:

Q. TODD DICKINSON

*Attesting Officer*    *Acting Commissioner of Patents and Trademarks*